Aug. 15, 1967  R. J. CURRAN  3,335,619
STEERING WHEEL SHAFT COLUMN
Filed Oct. 22, 1965  5 Sheets-Sheet 4
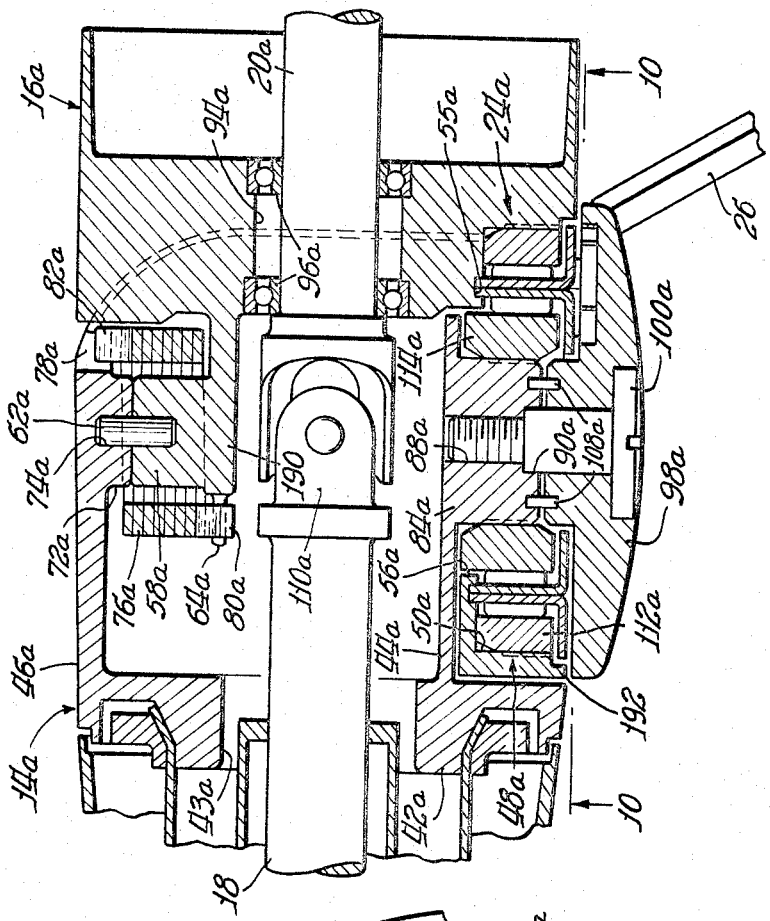
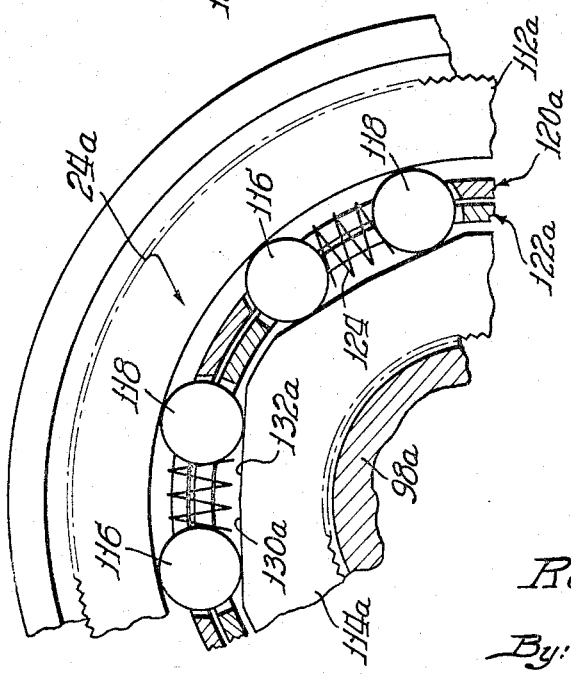
Inventor:
Robert J. Curran
By: John W. Butcher Atty.

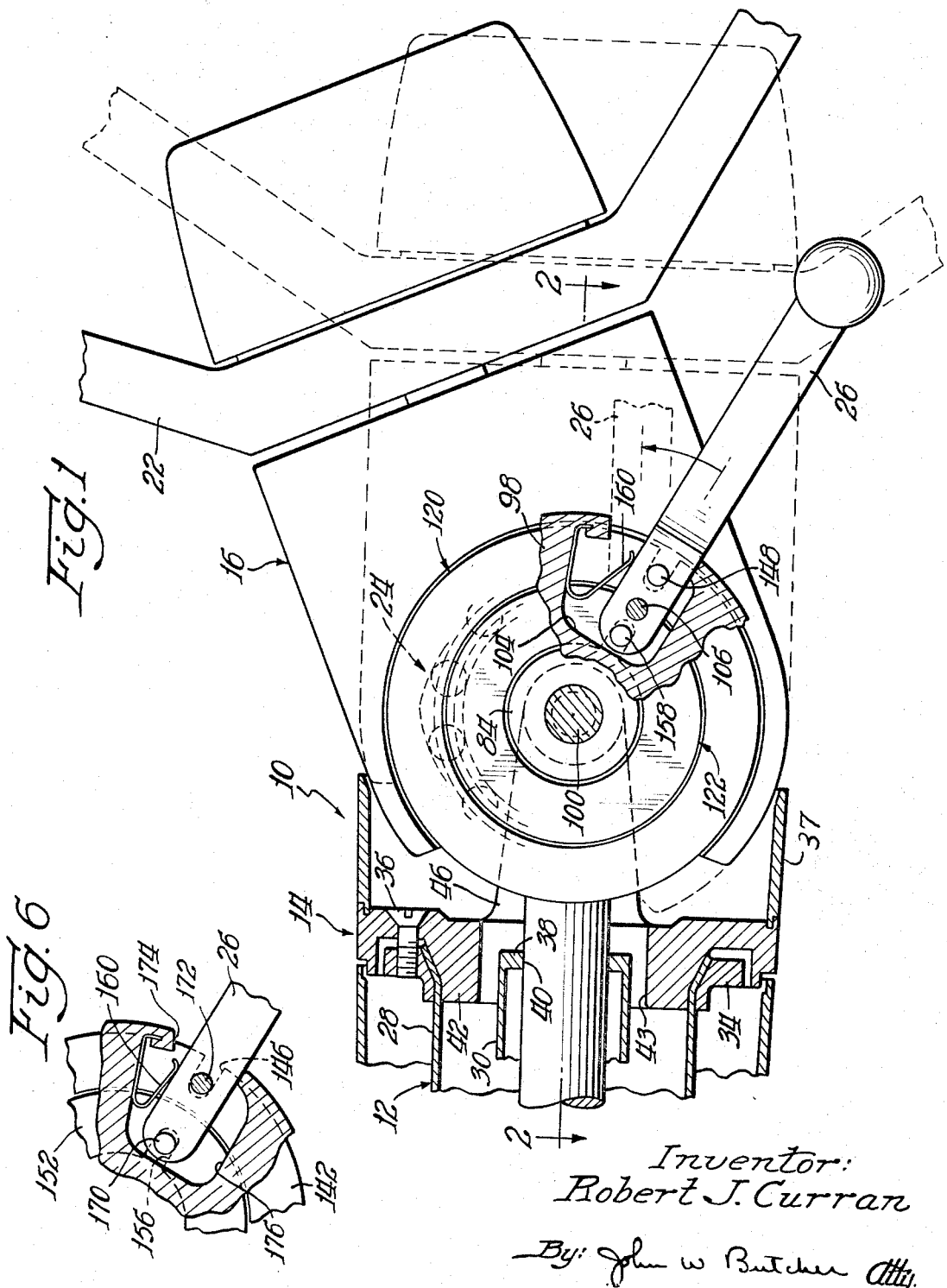

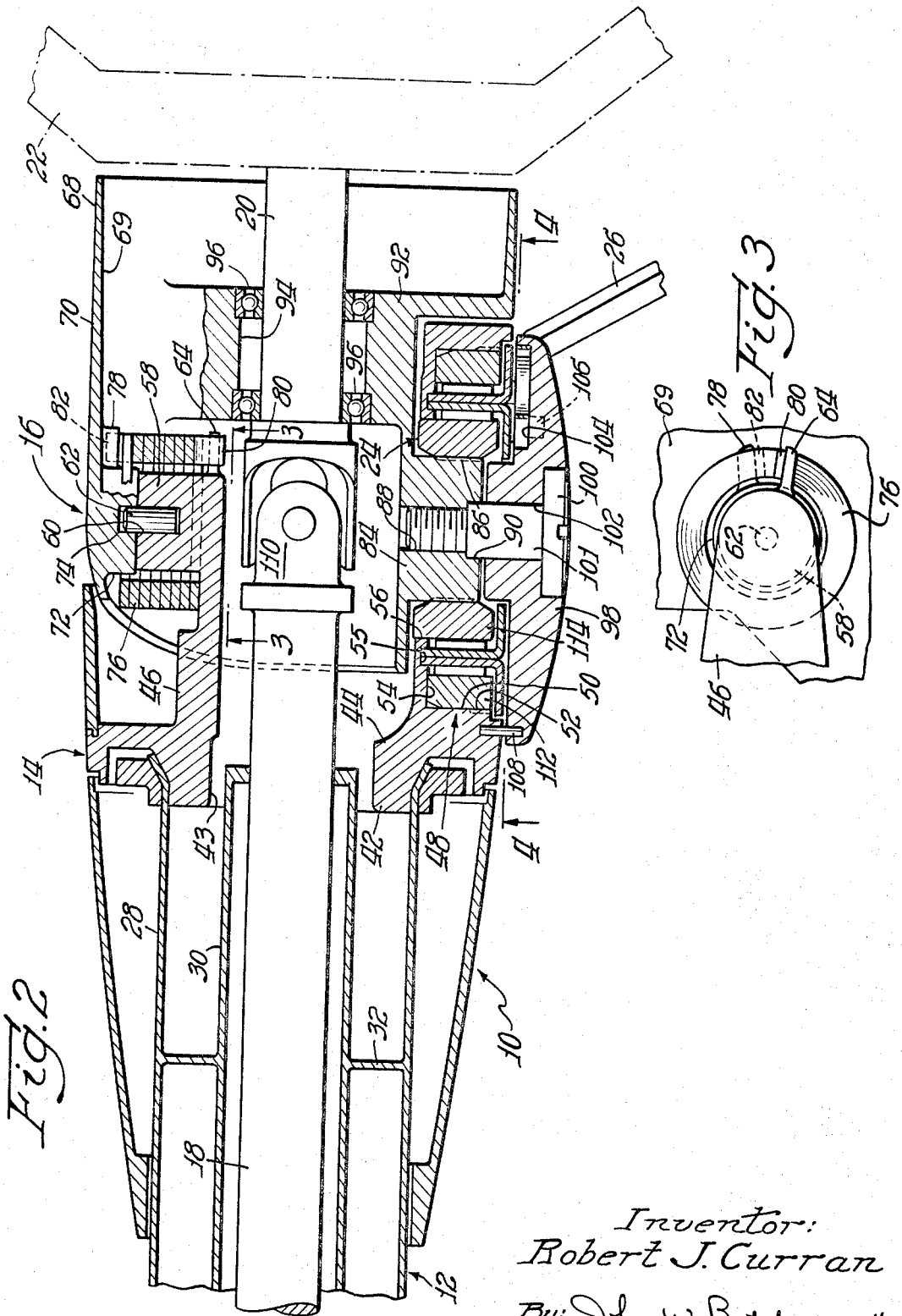

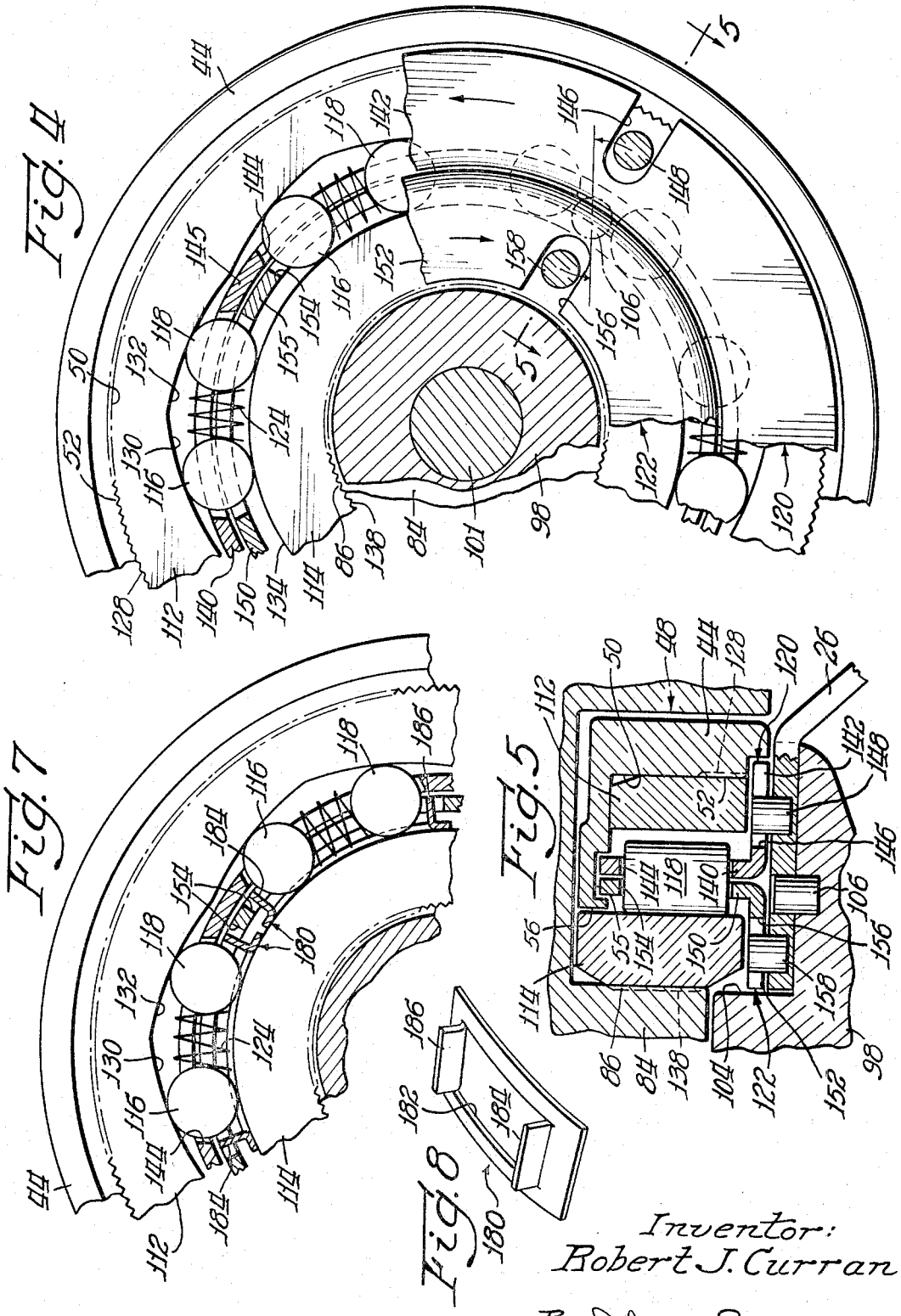

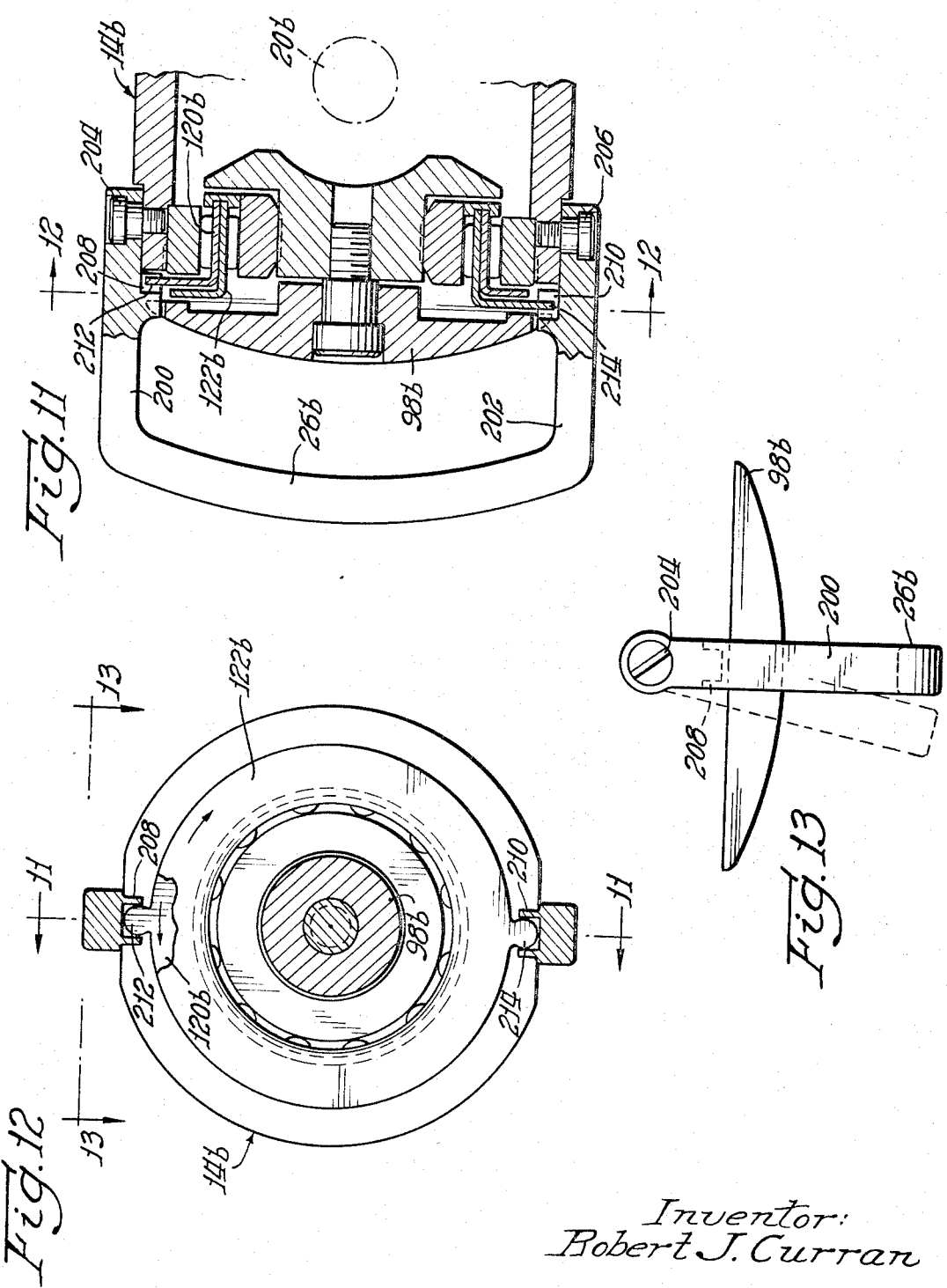

United States Patent Office 3,335,619
Patented Aug. 15, 1967

3,335,619
STEERING WHEEL SHAFT COLUMN
Robert J. Curran, Elmhurst, Ill., assignor to Borg-Warner Corporation, Chicago, Ill., a corporation of Illinois
Filed Oct. 22, 1965, Ser. No. 501,701
5 Claims. (Cl. 74—495)

ABSTRACT OF THE DISCLOSURE

A tiltable adjustable steering column includes a two-way roller clutch providing a bi-directional brake for maintaining any of an infinite number of adjusted positions without backlash. A release lever is mounted on the stationary member and may be mounted in any of a variety of positions parallel or non-parallel to the plane of rotation of the brake. The release lever can be arranged to release in either or both directions.

This invention relates to a steering mechanism, and more particularly to a tiltable steering wheel and the associated shaft lock which permits engagement of the steering wheel in a plurality of positions with respect to the steering column.

While other structures have been devised for tilting and locking a vehicle steering wheel with respect to a steering column, these structures have not provided for positioning the steering wheel in a continuum of positions. Usually these structures have provided several distinct positions, such as might be expected from the use of a locking pin adapted to be positioned in several different openings or holes; but this has proved to be somewhat unsatisfactory. These several positions are not wholly adequate to accommodate either the necessities or the individual preferences of drivers having different physical characteristics.

Furthermore, locking devices used in the past have suffered from other deficiencies. In some instances they have not been able to include both a positive locking arrangement and a means for quick and easy release of the lock.

Accordingly, it is an object of this invention to provide in an automotive vehicle or the like a tiltable steering wheel which can be easily locked in place in any of an infinite number of positions.

A further object is to provide means for locking the steering wheel portion relative to the remainder of the steering column, which means includes a two-way clutch unit which in its normal position locks one with respect to the other and in its unlocked position permits tilting of the steering wheel to an infinite number of desired positions.

It is a further object to provide a two-day clutch unit of the cam and roller type to accommodate the desired positioning and locking of the steering wheel.

A still further object is to devise a steering wheel column locking device which has a minimum of backlash.

The above and other objects and advantages of the invention will be more readily apparent when read in conjunction with the accompanying drawings in which:

FIGURE 1 is a view in elevation and partially in section of the clutch locking mechanism for locking the steering wheel relative to the steering column and showing the lever arrangement for actuating the locking mechanism;

FIGURE 1 is a plan view in section of the clutch locking mechanism taken along line 2—2 of FIGURE 1;

FIGURE 3 is a view taken along line 3—3 of FIGURE 2;

FIGURE 4 is an enlarged view partially in section of the clutch locking mechanism taken along the line 4—4 of FIGURE 2;

FIGURE 5 is an enlarged partial plan view in section taken along line 5—5 of FIGURE 4 showing the lever connection to the roller cages of the clutch locking mechanism;

FIGURE 6 is a view partially in section illustrating a modification of the lever arrangement shown in FIGURE 1;

FIGURE 7 is a view of a clutch mechanism similar to that of FIGURE 4 but showing a modified roller cage arrangement;

FIGURE 8 is a perspective view showing a detail of a portion of the roller cage arrangement of FIGURE 7;

FIGURES 9 and 10 are views of a steering wheel locking clutch mechanism similar to that of FIGURES 2 and 4 respectively but modified to the extent that the cammed surfaces of the clutch are formed on the inner race;

FIGURE 11 illustrates an alternate type of lever arrangement from that of FIGURE 1 for actuating the clutch locking mechanism;

FIGURE 12 is a view taken along the line 12—12 of FIGURE 11; and

FIGURE 13 is a view taken along the line 13—13 of FIGURE 12.

Referring now to the drawings, wherein the numerals in the different views identify identical parts, 10 generally indicates a portion of a steering mechanism of an automotive vehicle. As best seen in FIGURES 1 and 2, the steering mechanism comprises a lower steering column 12, a lower steering column extension 14, an upper steering column body 16, a lower steering shaft 18, an upper steering shaft 20, a steering wheel 22, a controllable shaft locking means 24 for locking the upper steering column 16 and steering wheel 22 relative to the lower steering column 12, and a lever 26 for unlocking the locking means 24 to permit tilting of the steering wheel and upper steering column with respect to the lower steering column.

The lower steering column 12 comprises a tubular structure which is attached to and supported by a vehicle body in a conventional manner. The column 12 includes an outer tubular element 28 and an inner tubular element 30, the latter serving as a structural support for the former by virtue of rib elements 32 joining the two elements. The upper end of tubular element 28 is attached by suitable means to a circular flange support 34. The lower steering column extension 14 is attached to the radially outwardly extending flange support 34 by a plurality of bolts 36 and thus forms the upper part of the lower steering column. Surrounding the upper part of the lower steering column is a tapered shoulder or guard 37, which is also attached to extension 14. The support 34 need not be a completely peripherally extending support, but could comprise a plurality of lugs welded or otherwise affixed to the tubular element 28.

The inner tubular element 30 has formed at its upper end a radially inwardly extending flange portion 38 defining an opening 40 for receiving the lower steering shaft 18.

The lower steering column extension 14 comprises a housing including an annular base portion 42 and two axially extending arm portions 44 and 46, substantially perpendicular to the base portion 42 and adapted to be pivotally associated with the upper steering column 16. The base portion 42 is secured to the flange support 34 as by bolts 36.

The arm portion 44 comprises in part the housing for the shaft locking means 24. In the arm portion 44 there is formed a substantially cylindrical recess 48 which opens radially outwardly and is adapted to receive means for accommodating the outer race of a clutch mechanism.

The recess 48 defines a peripheral wall surface 50 extending substantially perpendicular to the common axis of the steering shaft 18 and steering column 12. Serrations 52 are formed on the wall surface 50.

The recess 48 also defines a circular flat surface 54. The bottom of recess 48, which includes annular slot 55, serves as a cage bearing or retainer. An opening or bore 56 in the arm portion 44 intersects the flat bottom surface 54 substantially at its center and communicates with the recess 48. The opening 56 is adapted to receive a part of the upper steering column housing, as will be more fully described later.

The portion 46 of the lower steering column extension 14, substantially perpendicular to the base portion 42, includes a radially outwardly extending boss 58. A dead end opening 60 is formed in the boss 58 and receives one end of a bearing pin 62. A finger 64, adapted to receive a spring end, is also formed on the upper end of portion 46.

A central opening 43 is formed in the base portion 42 and with the inner walls of portions 44 and 46 defines an elongated opening of a sufficiently large size to permit the insertion of steering shaft 18.

The upper steering column 16 comprises an elongated housing 68, generally cup-shaped and having inner and outer wall portions 69 and 70. The housing is adapted to coact with the portions 44 and 46 of the lower steering column extension 14 and to form with the latter a portion of a controllable shaft locking means 24. The shaft locking means 24 provides the interconnection between the upper steering column 16 and the lower steering column extension 14 to permit tilting of the former with respect to the latter, the former being movable and the latter being stationary.

A radially inwardly extending boss 72 is formed on the inner wall portion 69. A hole 74 is formed in boss 72 to receive the other end of bearing pin 62. The diameter of boss 72 is of the same or approximately the same diameter as the boss 58. Thus boss 72 and boss 58 are adapted to support a torsion spring 76 which is mounted surrounding them. Adjacent the boss 72 there is a finger 78 adapted to receive one end of the spring.

The torsion spring 76 is composed of a plurality of coils, with spring end 80 engaging finger 64 and spring end 82 engaging finger 78 (FIG. 3). Its purpose is to assist in returning the steering wheel to the uppermost allowable position with respect to the lower steering column.

Substantially diametrically opposite the boss 72 there is, on the outer wall portion 70 of the upper steering column 16, a radially outwardly extending boss 84 which in the assembled device extends through the opening 56 and receives a means for accommodating the inner race of a clutch mechanism. Serrations 86 are formed on the outer periphery of the boss 84. A threaded bore 88 is formed in the boss 84 and has a counterbore 90 at the outer end to provide a close fit for a machine screw used to secure a cover plate over the shaft locking means.

Also on the inner wall 69 is a radially inwardly extending flange 92 surrounding a bore 94 in which are positioned roller bearings 96 for rotatably supporting the upper steering shaft 20, to which the steering wheel 22 is attached.

A cover plate 98 encloses the shaft locking means 24 and is secured to the boss 84 by a threaded machine bolt 100, the upper portion of which is unthreaded and serves as a bearing pin 101. The cover plate 98 has a central bore 102 which loosely receives the machine bolt 100, and acts as a complementary bearing surface for the bearing pin 101. The machine bolt 100, in conjunction with counterbore 90, and the pin 62, in conjunction with holes 60 and 74, provide the pivots for upper steering column 16 when it becomes desirable to tilt the steering wheel.

A recessed portion 104 at the outer periphery of the cover plate accommodates the lever 26. A pivot pin 106 is positioned in the recessed portion to provide a pivot for the lever 26. The cover plate 98 is secured against rotation by a pin 108 interconnecting steering column extension 14 and cover plate 98 as seen in FIGURE 2.

The lower steering shaft 18 of the steering mechanism 10 extends through opening 40 of the inner tubular element 30 and into the open area defined in part by the inner wall surface of axially extending portions 44 and 46 and the inner wall portion 68. Upper steering shaft 20, to which is connected steering wheel 22, also extends into this open area and is there joined to shaft 18 by a universal joint 110. The shaft 20 is rotatably mounted in roller bearings 96.

The shaft locking means 24 used in conjunction with this tilting steering wheel device is in the nature of a two-way roller clutch mechanism in which the clutching or gripping elements are normally engaged with associated races to lock the upper and lower steering columns with respect to one other. The clutch is disengaged by operation of a lever mechanism. The lever actuates cages supporting the clutching elements to disengage the clutch and thus permit tilting of the steering wheel and associated upper steering column with respect to the lower steering column and its extension.

The shaft locking means 24 (FIGS. 4 and 5) comprises an outer race 112, and inner race 114, a plurality of pairs of rollers 116 and 118, outer and inner cages 120 and 122 associated with the rollers, energizing springs 124 associated with each pair of rollers, and lever means 26 associated with each of the cages for disengaging the shaft locking means.

The outer race 112 is associated with the peripheral wall surface 50 of the recess 48 of lower steering column extension 14. The outer race is in the form of a ring structure having serrations 128 on the outer periphery which are adapted to mesh with serrations 52 on the surface 50 to hold the ring in place in the recess 48. Other suitable means such as keying, for example, may be used to hold the race in place. On the inner periphery of the outer race there are a plurality of pairs of opposed cam surfaces 130 and 132 for association with the rollers 116 and 118 respectively. The embodiment shown in FIGURE 4, for example, is constructed with six pairs of opposed cam surfaces and six pairs of rollers. Any number of pairs of cam surfaces could be used with associated rollers. Referring specifically to FIGURE 4 it will be noted the cam surfaces 130 and 132 are of a slight arcuate form and together form an arch-like configuration.

The inner race 114, which defines a cylindrical surface 134, comprises a ring structure which is associated with and assembled onto the boss 84 of the upper steering column 16. Serrations 138 on the inside of the ring mesh with complementary serrations 86 on boss 84 to hold the inner race in place. It will be observed in FIGURE 2 that the inner race is of such a diameter that it extends through and forms a close fit with the opening 56 in the arm portion 44.

The outer cage 120 comprises an annular metal member having an axially extending portion 140 and a radially outwardly extending flange 142. The axially extending portion 140 includes a plurality of circumferentially spaced generally rectangular openings or windows 144, corresponding to the number of pairs of rollers, and each receives both rollers of a pair.

A slot 146 is formed in the flange portion 142 of the outer cage. The slot extends from the outer periphery of the flange portion 142 radially inwardly a distance about three-fourths of the radial extent of the flange. It is adapted to receive a pin 148 attached to the lever 26.

The inner cage 122 also comprises an annular metal member having an axially extending portion 150 and a radially inwardly extending flange 152. The axially extending portion 150 includes a plurality of openings or windows 154, corresponding to the number of pairs of rollers, and each receives both rollers of a pair. The windows 144 of the outer cage and the windows 154 of the inner cage are in register with one another when the shaft locking means is in its engaged position. Fingers 145 and 155 separate the windows 144 and 154 respectively and have edges which may be slightly bevelled to generally conform to the curvature of the rollers. The fingers are adapted to contact the rollers to remove them from wedging engagement with the races when the cages are actuated by the lever 26.

A slot 156 is formed in the flange portion 152 of the inner cage. This slot extends from the inner periphery of the flange portion 152 radially outwardly a distance about three-fourths of the radial extent of the flange. This slot 156 is adapted to receive a pin 158 attached to the lever 26. The cages are relatively rotatable with respect to one another.

An energizing spring, multi-leaf compression spring 124, is positioned between the rollers 116 and 118 for urging each roller to a normally engaged position. This normally engaged position is shown in the upper portion of FIGURE 4 where the roller 116 is shown to be in contact with the inner race surface 134 and the cam surface 130 of the outer race, and the roller 118 is shown to be in contact with the inner race surface 134 and the cam surface 132. The dotted line positions of the rollers show the rollers in the disengaged position.

The lever 26 is pivotally mounted on the cover plate 98 by means of the pivot pin 106. Pins 148 and 158 are fixed to the lever 26 and are disposed on opposite sides of the pivot pin 106 so that the three pins 148, 106 and 158 are arranged in substantially a straight line. In the assembly, pins 148 and 158 engage outer and inner cages 120 and 122 respectively as easily seen from FIGURES 4 and 5.

It will be observed that this pivot pin 106 is radially positioned at a point almost between the cages so that movement of the lever in one direction will effect movement of both cages connected to the lever. As shown in FIGURE 1 a spring 160 is secured in the recess 104 of the cover plate 98 for urging the lever back to the position illustrated after the lever has been rotated to disengage the clutch.

*Operation*

When it becomes desirable to tilt the steering wheel 22 from a normal position as shown in FIGURE 1, i.e. from a position obliquely above the steering column 12 and its extension 14, the shaft locking means is unlocked. To do this the lever 26 is moved counterclockwise as shown by the arrow (FIGURE 1) about its pivot 106 in the cover plate 98. By virtue of pins 158 and 148 being attached to the lever 26, the inner and outer cages are counterrotated with respect to each other, the inner cage moving clockwise and the outer cage moving counterclockwise as seen in FIGURE 4. Thus outer cage 120 moves rollers 118 in a counterclockwise direction and inner cage 122 moves rollers 116 in a clockwise direction, against the pressure of springs 124, to a position out of locking engagement with the inner and outer races.

The upper steering column 16, to which the inner race 114 is attached, and the steering wheel 22 can now be pivoted or tilted about the bearing pin 62 and machine bolt 100. This tilting takes place against the resistance of torsion spring 76 which tends to keep the upper steering column 16 in its uppermost position. When the desired tilted position has beene established, the lever 26 is released, a spring 160 urges the lever 26 back to its original position, and the cages 120 and 122 are consequently rotated back to their original positions. The springs 124, which have been compressed between each pair of rollers 116 and 118, will release their energy and will force the rollers back into engagement with the inner and outer races so that the upper steering column 16 and the associated steering wheel are locked in the newly assumed tilted position.

It would be possible, if the roller energizing springs 124 were of sufficient capacity, that the return spring 160 would not be needed. In such event, release of the lever 26 would permit the springs 124 to release their energy, force the rollers back to their original engaged positions between the races, and carry with them the cages, which in turn would rotate the lever 26 back to its original position through the connections with pins 148 and 158.

Essentially the same procedure is used to raise the steering wheel as is used to lower it. One of the important features to be noted here is that, because of the opposing cam surfaces 130 and 132, the locking means 24 in its locked condition prevents movement of the upper steering column in either direction relative to the lower steering column. For example, any tendency of the inner race 114 to move clockwise would wedge rollers 118 more tightly between inner race surface 134 and cam surface 132. Any tendency of the inner race to move counterclockwise would wedge rollers 116 more tightly between inner race surface 134 and cam surface 130. Thus there is substantially no backlash associated with this type of locking device.

It will be appreciated that while the construction shown in FIGURES 1–5 shows the lever 26 operable in only one direction to release the rollers from wedging engagement, the lever and cages can be interconnected so that the lever will effect disengagement by movement in either a clockwise or a counterclockwise direction. This could be done, for example, by modifying both the recess 104 in the cover plate and the relative position of the lever. A return spring similar to spring 160 could be positioned on the other side of the lever.

In FIGURE 6 an alternate lever arrangement is shown for releasing the shaft locking means. In this modification the lever 26 is a floating lever. It has two attached pins 170 and 172 which are adapted to fit in slots 156 and 146 respectively. The lever has no central pivot like pin 106 shown in FIGURE 4. The pivot used in this alternate arrangement will be either of the pins 170 or 172, depending on which cage has the greatest resistance. If the inner cage sticks, the lever will pivot on pin 170 until it hits the stop 174. In the process the rollers 118 will be dislodged from their engaged position and the outer cage will move freely. Then with additional counterclockwise motion the lever 26 will pivot about the stop 174 until the lower end hits the stop 176 releasing the rollers 116 from their wedging position. The inner cage will then be free to move. Thus when the lever 26 hits both stops 174 and 176 the clutch will be fully released.

If the outer cage sticks, that is if the residual torque tending to wedge the rollers 118 into engagement is greater than those tending to wedge rollers 116 into engagement, the lever will strike stop 176 releasing the rollers 116 and the inner cage. Then further movement of the lever 26, using the stop 176 as a fulcrum, will release the rollers 118 and the outer cage. With this lever arrangement of FIGURE 6 it is apparent that longer lever arms are available and, therefore, that this arrangement is particularly useful in overcoming high residual torque. In addition, a disengaging force is brought to bear to disengage the rollers in only one direction at a time.

When the steering wheel has been tilted to the desired position, the lever is released and the return spring 160 returns the lever to its normal position, the rollers thus being permitted to reassume their normal engaged position.

In an effort to prevent excessive residual torque there may be incorporated into the shaft locking means floating cage segments 180, one being associated with each pair of rollers 116 and 118 (see FIGURES 7 and 8). The cage segment 180 comprises a rectangular portion, preferably of metal, having a generally rectangular window 182 of sufficient width to receive the rollers 116 and 118. The cage segment is curved to substantially conform to the curvature of the cylindrical inner race, and is designed to ride the race. At each end of the window 182 are upstanding lug portions 184 and 186. The dimensions of these lug portions are such that they fit up through the windows 154 of the inner cage and extend radially such a distance so that in the assembled device the top of the lug portions are substantially even with the outer dimension of the inner cage as seen in FIGURE 7. The circumferential distance between the lug portions of a cage segment is made equal to what the normal circumferential length of a cage window 154 would be if no additional cage segments were used (as in FIG. 4). Thus it will be recognized that the circumferential lengths of the windows in the inner cage must be long enough to accommodate the lug portions 184 and 186 of the cage segments. It will be apparent that the lug portions, when made of reasonably strong material, will provide additional and more positive confinement for a pair of rollers 116 and 118 and will limit the distance that the rollers may move apart, consequently limiting the degree of wedging of the rollers between the associated races and thereby preventing high residual stresses in the races.

FIGURES 9 and 10 illustrate a second embodiment of the shaft locking device. In this embodiment, however, the cammed surfaces are formed on the inner race. Since it is desirable that the cammed race be stationary, the details of the structure are somewhat different from those of the embodiment of FIGURES 1–5. Where possible, like numerals are used to designate similar parts in the second embodiment, with the suffix *a* applied to these numerals.

In this second embodiment, a lower steering column extension 14a is secured to a lower steering column by a flange support in a manner similar to that of the first embodiment. The lower steering column extension 14a comprises a body formed of an annular base portion 42a and two axially extending arm portions 44a and 46a which are adapted to be pivotally associated with an upper steering column body 16a. A central opening 43a is formed in the extension 14a for receiving the lower steering shaft 18a.

The arm portion 44a includes an outwardly and laterally extending boss 84a to which is secured the inner race of the shaft locking mechanism. The boss 84a has a threaded bore 88a and counterbore 90a for receiving machine screw 100a, used in attaching cover plate 98a to the boss 84a to enclose the clutch structure of the shaft locking means 24a. Rotation of cover plate 98a with respect to the boss 84a is prevented by the pins 108a.

The arm portion 46a includes a radially inwardly extending boss 72a having bore 74a for receiving a bearing or pivot pin 62a, which serves as one of the pivots for the upper steering column body 16a. Adjacent the boss 72a there is a finger 78a adapted to receive one end of a torsion spring 76a.

The upper steering column body 16a is pivotally associated with the lower steering column extension 14a and is also adapted to be locked to the latter by the lock means 24a. The body 16a has a central bore 94a. Bearings 96a are positioned in the bore 94a and rotatably support upper steering shaft 20a, which is connected to lower steering shaft 18 by means of a universal joint 110a. The body 16a is formed with an axially projecting arm 190 on which is formed a laterally and outwardly extending boss 58a. A bore 60a in the boss 58a is adapted to pivotally receive the bearing pin 62a. Also on arm 190 is a finger 64a adapted to receive the other end of torsion spring 76a. The torsion spring encompasses the bosses 58a and 72a, and spring ends 80a and 82a are attached respectively to fingers 64a and 78a.

Also on the body 16a and disposed substantially diametrically opposite the arm 190 is an axially projecting portion 192, which forms part of the housing for the clutch locking means. The portion 192 includes a cylindrical recess 48a defining a peripheral wall surface 50a to which is secured the outer race 112a. An opening 56a in the thin-wall section of the portion 192 receives the projecting boss 84a of the lower steering column extension 114a and serves as a bearing therefor. Inner race 114a is attached to the boss 84a. Annular slot 55a serves as a cage bearing or retainer.

In this second embodiment the shaft locking means 24a in a two-way roller clutch which functions similarly to the roller clutch of the first embodiment. In the second embodiment, however, a plurality of opposed cam surfaces 130a and 132a are formed on the inner race 114a and are associated with a plurality of pairs of roller wedging elements 116a and 118a. The energizing springs 124a and the inner and outer cage members 120a and 122a are of the same type as disclosed in connection with the first embodiment.

The level 26 for releasing the rollers from wedging engagement is of the same type as in the original embodiment and is connected to the cage in the same manner as shown and described previously. The modified form of lever shown in FIGURE 6 may also be used in connection with this second embodiment.

To release the shaft locking means 24a the lever 26 is operated to rotate outer cage 120a and inner cage 122a relative to each other to dislodge the rollers from their normal wedging position. Then the upper steering column body 16a, to which the steering wheel is attached through shaft 20a, is tilted about the pin 62a, and the axially projecting portion 192 and the attached outer race roll around the disengaged pairs of rollers 116a and 118a. This tilting movement takes place against the force of torsion spring 76a, which seeks to keep the upper steering column body 16a in its uppermost position.

It will be noted in each of the two preceeding embodiments that the cammed race is secured to the fixed member, the lower steering column extension, and that the cylindrical race is associated with the movable member. This makes it possible for the mechanism to be actuated with the only required movement of the rollers being from their locking to unlocking position and back again.

In FIGURES 11, 12 and 13 an alternate embodiment of the lever used to actuate the shaft locking means is disclosed.

In this embodiment, described in conjunction with a locking means of the type shown in FIGURES 1–5, a U-shaped lever 26b is pivotally mounted on the stationary member, lower steering column extension 14b, and is constructed for engagement with both of the cages so that pivotal movement of the lever will rotate the cages in opposite directions to effect a release of the clutch. Two leg portions 200 and 202 of the U-shaped lever are mounted for pivotal movement on member 14 by means of machine screws 204 and 206. The lever extends laterally outwardly from the steering column. Yoke-like section 208 and 210 on the lever 26b engage lugs or projections 212 and 214 on the outer cage 120b and inner cage 122b respectively. Thus when the lever 26b is pivoted in the direction as shown in FIGURE 13, or in the other direction, the cages 120b and 122b are rotated in opposite directions relative to each other and are effective to disengage the shaft locking means by releasing the rollers from their wedging positions. Then the steering wheel and the upper steering column with which it is associated can be tilted to the desired position.

It will be noted that I have advantageously provided a steering wheel shaft locking device which permits tilting of the steering wheel to an infinite number of positions within the extreme positions of the total tilting arc. Thus it is possible to more easily select the most desirable steering wheel position as required by each individual driver. This is particularly desirable in automobiles used in our modern car renting services where many different drivers will drive the vehicle.

In addition, this two-way roller clutch locking device provides a solid support at all times and eliminates the problem of backlash in securing the pivoting member of the steering column to the stationary member.

While certain specific embodiments of the invention have been disclosed, it is understood that the invention is not limited to only these, as other variations will be readily apparent to those skilled in the art. The invention is to be given its fullest possible interpretation within the terms of the following claims:

I claim:

1. In a steering column having upper and lower sections, the lower section being relatively stationary and the upper section being moveable with respect to the lower section;

means for locking said upper and lower sections comprising a two-way clutch providing a bi-directional brake, said clutch including a cylindrical race associated with said moveable upper section, a cammed race associated with said relatively stationary lower section, and at least one pair of roller clutching elements disposed between said cammed and cylindrical races for engagement therewith for locking said races and their respective associated steering columns against tilting movement with respect to each other;

biasing means associated with said roller clutching elements for urging said clutching elements into engagement with said races; and releasing means for disengaging said clutching elements from their locking position to permit tilting of said upper section with respect to said lower section including a pair of annular counterrotatable cages disposed between said race means for receiving said clutching elements, and lever means for actuating said cages mounted on said stationary lower section engageable with said cages so that one of said cages is rotated in a clockwise direction and the other in a counterclockwise direction to simultaneously release both of said clutching elements responsive to actuation of said lever.

2. The device of claim 1 wherein said actuating means comprises a U-shaped lever mounted on the lower section of the steering column and the cage means include lug portions operatively connected to said U-shaped lever.

3. The device of claim 1 including means for effecting reengagement of said locking means when said actuating means is released.

4. The device of claim 1 wherein said cage actuating means comprises lever means connected to each of said cages in a manner whereby either of said latter connections may be used as a pivot means for operating said lever means depending on the relative forces tending to engage the clutch device in either direction.

5. The device of claim 1 further including auxiliary cage means associated with each pair of roller clutching elements to limit the wedging force of said clutching elements to thereby prevent excessive residual stresses in said locking means.

References Cited

UNITED STATES PATENTS

| 1,471,398 | 10/1923 | Inglis. |
| 3,017,964 | 1/1962 | Von Thuengen _____ 192—45 X |
| 3,128,635 | 4/1964 | Doolittle _____ 74—471 |
| 3,167,971 | 2/1965 | Zeigler et al. _____ 74—555 |
| 3,200,916 | 8/1965 | Rasmussen _____ 192—8 |
| 3,243,023 | 3/1966 | Boyden _____ 192—45 X |

FOREIGN PATENTS

| 888,934 | 9/1943 | France. |
| 23,891 | 1909 | Great Britain. |
| 603,979 | 2/1958 | Italy. |

FRED C. MATTERN, JR., *Primary Examiner.*

CAROLYN F. GREEN, *Assistant Examiner.*